United States Patent
Kersch et al.

[11] 3,860,346
[45] Jan. 14, 1975

[54] METHOD OF COMPENSATING FOR GROSS OBJECT MOTION IN REAL TIME HOLOGRAPHIC INTERFEROMETRY

[75] Inventors: Leonard A. Kersch; Edwin B. Champagne, both of Ann Arbor, Mich.

[73] Assignee: GCO, Inc., Ann Arbor, Mich.

[22] Filed: Feb. 18, 1970

[21] Appl. No.: 12,282

[52] U.S. Cl. ............................... 356/109, 350/3.5
[51] Int. Cl. ............................................. G01b 9/02
[58] Field of Search ............... 356/106, 109, 113; 73/71.3, 67.5 H; 350/3.5

[56] References Cited
OTHER PUBLICATIONS

Stetson, Karl A. et al., "Hologram Interferometry," JOSA, vol. 56, No. 9, September 1966. pp. 1161–1166.

Matsumoto, K., "Holographic Multiple-Beam Interferometry," JOSA, vol. 59, No. 6, June 1969. pp. 777–778.

*Primary Examiner*—William L. Sikes
*Assistant Examiner*—Conrad Clark
*Attorney, Agent, or Firm*—Krass & Young

[57] ABSTRACT

To analyze the bond between the skin and core of a metal honeycomb section a hologram is formed of the skin surface and then the skin is heated and a real time holographic interferometry comparison is made. The bowing of the section during the heating results in a high interference fringe frequency over much of the surface making analysis difficult. The angle of the illumination beam and the position of the spacial filter producing the illumination beam are adjusted, relative to the object, to reduce the spacial frequency due to bowing in particular areas of the surface of the object to reveal deformation anamolies identifying defects resulting from failures of bond between the core and skin.

7 Claims, 6 Drawing Figures

INVENTORS
Edwin B. Champagne, &
BY Leonard A. Kersch
Barnard, McGlynn & Reising
ATTORNEYS

METHOD OF COMPENSATING FOR GROSS OBJECT MOTION IN REAL TIME HOLOGRAPHIC INTERFEROMETRY

BACKGROUND OF THE INVENTION

1. Field of the Invention.

This invention relates to methods of nondestructively testing objects by comparing their surfaces before and after stressing with holography interferometry to detect localized deformation anamolies, and more particularly to techniques for modifying the interferometric process to compensate for gross deformation of the object.

2. Prior Art.

Holography involves the recording and reconstruction of light wave-fronts by photographically recording the interference pattern between coherent light reflected from a scene or object and a reference wave-front of coherent light from the same source that illuminated the scene or object. After development the resulting "hologram" may be used to reconstruct the original reflected light wave-front by illuminating the hologram with an appropriate light source, usually coherent. The development of the laser as a source of highly coherent light has spurred the development of holography in the last few years. "Holography Interferometry" is a technique which employs a wave-front system reconstructed from a hologram to detect minute deformations on the surface of an object. In "real time" analysis the reconstructed wave-front, representing an object at a first time, is superimposed on a wave-front reflected from the object at a second time as the object is illuminated with light that is coherent with that used in the reconstruction. In "double-exposure" holographic interferometry wave-fronts of the object at two separated times are both recorded on the same photographic plate, so that they may be simultaneously reconstructed in the superimposed manner. In both techniques minute deformations of the object resulting from movements between the times of the formation of the two wave-fronts are revealed in the form of fringe lines which are visible on the superimposed reconstruction. These fringe lines generally are arrayed somewhat as contours of equal displacement of the surface of the object between the two times under consideration. If the entire object translates normally to the line of vision of the observer viewing the reconstruction through the hologram almost no fringe line array will be noted (absolutely no fringe array would be noted if the wave-fronts were planar rather than curvalinear), although the total surface of the image may appear brightened or darkened. If the object has been rotated about an axis parallel to the hologram between the two times under consideration a relatively uniform array of fringe lines will appear on the interferometric reconstruction.

Holographic interferometry has been successfully employed to nondestructively test a variety of forms of work-pieces by stressing them in some way between the times of the two wave-fronts and then detecting anamolies in the deformation pattern which is revealed by the interferometrics analysis. For example, separations between the carcass and plies of a tire may be detected by inflating the tire and performing an interferometric analysis of the surface of the tire two times shortly after inflation. Following inflation the tire will deform for some time as a result of creep of the rubber and sections of the surface overlying separations will tend to creep at a different rate than the balance of the tire. Accordingly, an holographic interferometry analysis made at two times after inflation will reveal such separations.

The fringe lines which occur in real time holographic interferometry analysis represent slopes of the object relative to the axis of visual examination which are related to the wavelength of the coherent light employed in the analysis. If a section of the surface moves through a distance which is gross compared to this wavelength the resulting sloped areas will appear with a high fringe density which makes it difficult to detect anamolies of the fringe pattern. The present invention has as its prime object to provide a method of real time holographic interferometric analysis which compensates for gross deformation of the object of the type which might cause high fringe densities so as to allow the detection and analysis of anamolies in these grossly deformed areas.

SUMMARY OF THE PRESENT INVENTION.

Broadly, the method of the present invention is to modify the position of the real time wave-front relative to the reconstructed wave-front during real time holographic interferometric analysis in order to achieve low spacial frequencies of fringes in selected areas of the object surface visible through the hologram. To illustrate the manner of operation of our method, assume that a hologram is formed of a section of an object, the object is then stressed, and as a result of the stressing a large section of the object rotates grossly about a line parallel to the original photographic plate. On reconstruction this rotated section will contain a dense fringe pattern so as to make it difficult or impossible to detect relatively minor anamolies in the deformation pattern. In order to compensate for this gross rotation so that the area can be examined for deformation anamolies, the present invention contemplates a modification of the angle of incidence of the wave-front which is illuminating the object, with respect to the object. This effectively rotates the wave-fronts reflected from the object with respect to those reconstructed from the hologram. If this rotation is performed through the same angle that the section under consideration is rotated as a result of the deformation, and in the same direction, the fringe lines resulting from the gross deformation will disappear on the object and it will be possible to detect more minor deformation anamolies. Since in practice various sections of the body will have been deformed in differing manners it is necessary to modify the illumination of the object in a different manner in order to view these various sections free of the fringes resulting from the gross deformation.

The gross movements of the object in directions normal to the hologram will also produce fringe lines because of the interaction of the spherical wavelengths. The present invention further contemplates the correction of the hologram for movements of this type by varying the apparent radius of the wave-fronts reflected from the object.

In practice, the angle of incidence of the illuminating light on the object will be varied by adjusting a mirror which reflects the light to the object from the laser and correction of radius may be achieved by adjustment of the position of the objective lens which is used to spread the laser beam to illuminate the object.

Very minor compensations for gross deformations may be made by modifying the position of the hologram relative to the reconstruction beam, as by adjusting either the hologram or the reconstruction beam. However, any such motion distorts the reconstructed wave-fronts, with the degree of distortion being proportional to the difference in position between the hologram and reconstruction beam relative to the photographic plate and reference beam used to form the hologram.

Other objects, advantages and applications of the present invention will be made apparent by the following detailed description of the preferred embodiment of the invention. The description makes reference to the accompanying drawings, in which.

Figure 2:
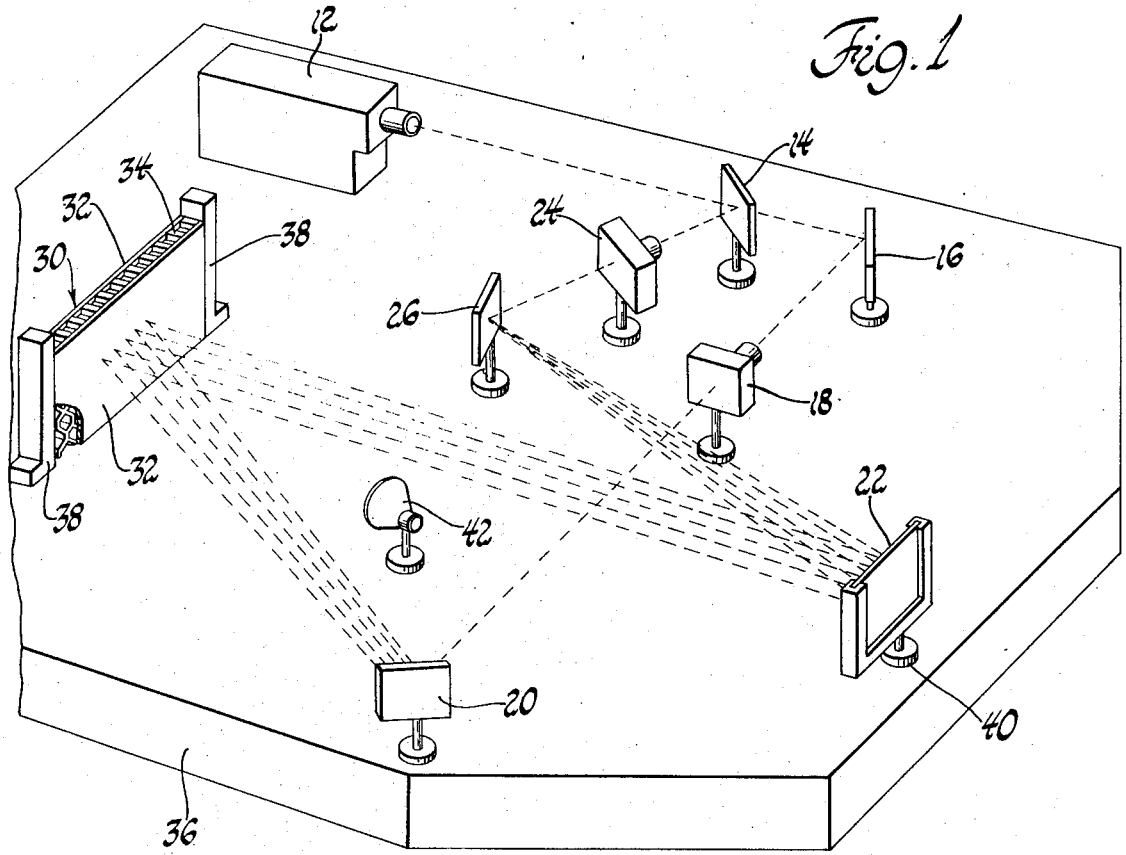
FIG. 2 is a perspective view of a holographic interferometric test setup.
Figure 5:
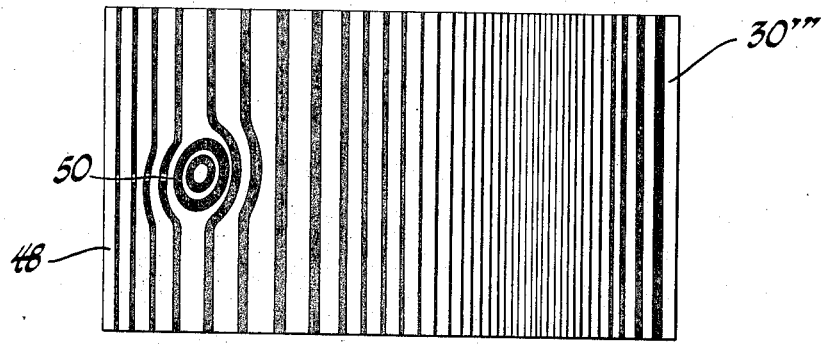
Figure 6:
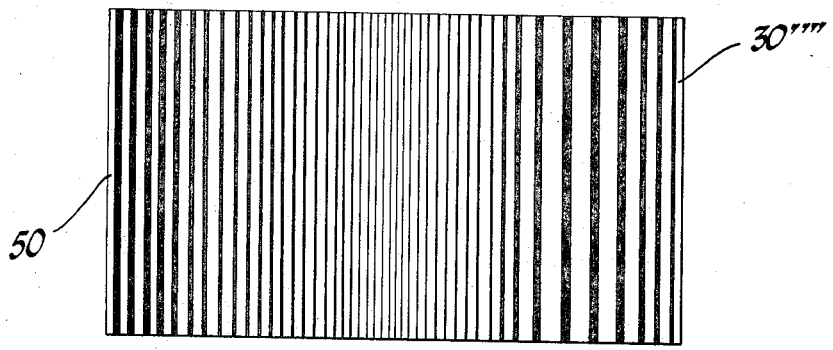

FIG. 5 is an illustration of the fringes which appear on the specimen of FIG. 2 when compensation is provided so as to decrease the spacial frequency of the interference fringes on the left side of the test specimen, revealing an anamolous deformation; and FIG. 6 is an illustration of the fringes which appear on the specimen of FIG. 2 with compensations so as to decrease the spacial frequency of the fringes on the right side of the specimen.

Real time holographic interferometry may be considered a two step process. In the first step a hologram is formed which records wave-fronts which emanate from an object by virtue of the reflection of coherent light used to illuminate the object. Development of this photographic plate and suitable illumination of it causes reconstruction of the original waveforms. In the second step these waveforms are substantially superimposed on the waveforms emanating from the object at a second time (real time) because of reflection of coherent light illuminating the object. It is essential that the light used to illuminate the object be coherent with respect to the light used to reconstruct the original wave-fronts from the hologram. The process essentially detects any differences between the reconstructed wave-fronts and the real time wave-fronts which result from motion or deformation of sections of the object between the time of formation of original hologram and later real time viewing. The differences in the two wave-fronts result in interference between them which reveals itself in the form of fringe lines on the virtual image reconstructed through the hologram.

Figure 1:
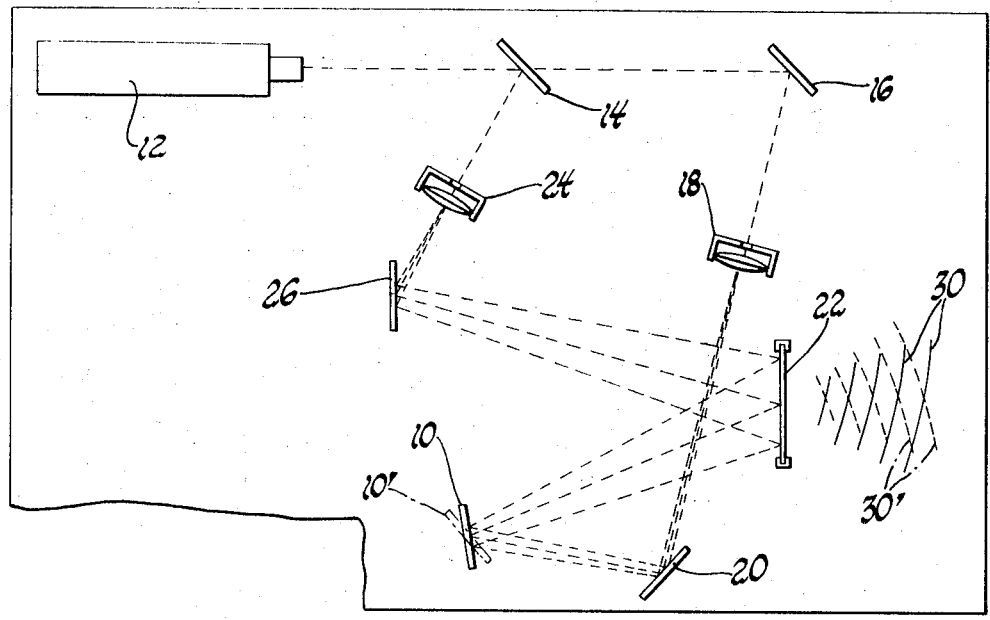
FIG. 1 is a schematic diagram of apparatus for forming holograms and using them in real time holographic interferometry, illustrating the nature of the interference which occurs between the reflected and the reconstructed wave-fronts.

FIG. 1 illustrates the mechanism of interference between the reconstructed and real time wave-fronts during this process. The apparatus of FIG. 1 may be used to form a hologram of an object 10 which takes the form of a plate having a small area so that the wave-front reflected from its surface can be considered to be spherical. Coherent light for formation of the hologram comes from a cw laser 12 which passes its output beam through a beam splitter 14. One of the split beam sections is reflected by a mirror 16 to a spacial filter 18 consisting of pinhole and objective lens, which cleans the ragged edges of the beam so as to increase its coherency, and causes it to diverge so that it may illuminate an area. The diverging beam from the spacial filter 18 is directed by a mirror 20 on to one surface of the plate 10. A photographic plate 22 is positioned to receive light reflected from the illuminated surface of the object 10 [hereinafter referred to as the object beam] as well as a "reference beam" of light which is derived by passing the other beam from the beam splitter 14 through a second spacial filter 24 and then reflecting it to the photographic plate 22 by means of a mirror 26. The photographic plate is of the high sensitivity, high definition type employed in holography and effectively records the interference pattern between the reference and object beams.

Upon development of the photographic plate 22 a hologram is obtained from which the object wave-front can be reconstructed. To achieve this reconstruction the hologram is placed in the same position the photographic plate occupied during the formation of the hologram and the laser is reinitiated. A viewer 28 looking through the hologram will see a virtual image of the object surface 10 which is identical in all optical properties to the image he would have seen had he been so positioned during the formation of the original hologram. The wave-fronts reaching his eye are created because of the diffraction effect the hologram has on the object beam.

If the object 10 is maintained in its original position during this reconstruction step and no deformation of the object has occurred since the time the original hologram was formed, the wave-fronts which emanate from the object on a real time basis will coincide with the wave-fronts which create the reconstructed virtual image of the object. These wave-fronts are schematically illustrated by the solid lines 30 in FIG. 1.

Interference between the reconstructed and real time wave-fronts will occur if the position of any element of the surface of the object is changed since the formation of the original hologram. Line 10 illustrates a rotation of the object about a line parallel to the hologram. This motion is purposely exaggerated for purposes of illustration. The real time wave-fronts reflected from the object 10' will not be coincident with the reconstructed wave-fronts. These real time wave-fronts emanating from the object 10' in its altered position are illustrated by the dotted lines 30'. It is apparent that interference effects will occur between the two wave-fronts. The surface of the object will be brightened in those areas where there is constructive interference between the two wave-fronts and will appear darkened in those areas where there is destructive interference, resulting in an apparent fringe pattern. It is clear that this fringe pattern presents a measure of the difference in position and contour of the object between the time of formation of the original hologram and the later interferometric viewing.

FIG. 2 illustrates the holographic interferometric test setup illustrated in FIG. 1 arranged to perform inspection on a section of metal honeycomb, generally indicated at 30, which consists of a pair of metal skins 32 sandwiching a central core 34 formed of corregated sections extending normally between the skin plates. The edges of the core are bonded to the skins to form an integral structure. The rectangular core section 30 is supported on a test bench 36, which also supports the optical elements, between a pair of end retaining plates 38 which restrain the vertical edges of this specimen.

To form an initial hologram of the surface of the skin section 32 which opposes the optical apparatus, a photographic plate 22 is inserted in a plate holder 40 and the laser 12 is energized so as to photograph and record the pattern of interference between an object beam reflected from the skin section and a reference beam from the mirror 26. After development of the plate the resulting hologram is reinserted in the holder 40 and the laser 12 is reenergized. During this reconstruction process it may be necessary to somewhat attenuate the beam from the mirror 20 which illuminates the object relative to the beam from the mirror 26 which reconstructs the original wave-fronts from the hologram in order to get an optimum interference pattern between the real time and reconstructed wave-fronts.

Assuming that the hologram has been reinserted in the plate holder 40 in the exact position that was previously occupied by the photographic plate 22 and that the geometry of the situation, including the position and contour of the test specimen 30 have otherwise been exactly preserved, a viewer looking through the hologram from the lower right side of the drawing will see a single image of the surface of the test specimen 30 without any contour lines thereon. This occurs because of the exact superposition of the reconstructed wave-front created by the hologram and the real time wave-fronts created by reflection from the test specimen.

However, any deviation of the surface of the test specimen 30 from its previous contour or position will result in interference between the reconstructed and real time wave-fronts and this interference will result in fringe lines appearing on the images as viewed through the hologram. This test set-up thereby provides a method of detecting deformations in test specimens between two times.

To test the bond between one of the skins 32 of the specimen 30 and the abutting core section, the skin 32 is heated, as by an infra-red lamp 42, after the formation of the first hologram. The theory underlying this technique is that the stresses imposed between the skin and core because of the thermal expansion of the skin resulting from the heating will stress the bond between the skin and the core. If the bond is uniform the resulting deformation of the skin will be uniform, but any anomalies in the bond, such as a debonded area, will permit motions of the adjacent skin which exceed the motions permitted in the bonded area. The holographic interferometric inspection is intended to detect such anamolous movements and thus detect any defects in the bond.

Figure 3:
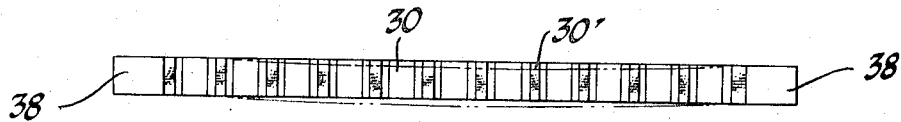
FIG. 3 is a top view of the test specimen illustrated in FIG. 2 showing, in exaggerated degree, the gross deformation which occurs on the test specimen by virtue of its being heated.

However, a difficulty arises in the practice of this testing method because of overall deformations of the test specimen which are not related to anomalies. The overall deformation which occurs in the preferred embodiment is illustrated in FIG. 3. (Even this deformation is idealized to simplify the fringe pattern by the assumption that no deformation occurs in the vertical plane.) The heating of one face of the test specimen causes an expansion of that face and an overall bowing of the specimen in the direction of the heat source. This is illustrated, in an exaggerated manner, in FIG. 3 by the dotted lines 30' which show the bowed position of the test specimen as a result of the heating.

Figure 4:
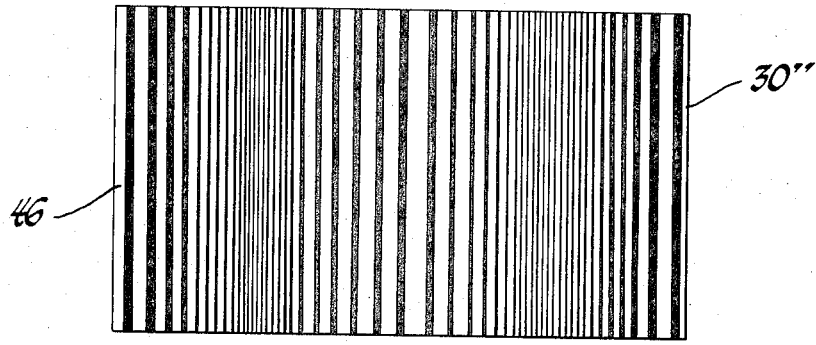
FIG. 4 is an illustration of the fringe lines which appear on the specimen shown in FIG. 2 without the compensation afforded by the method of the present invention.

FIG. 4 illustrates the image 30'' of the test specimen as it might appear as viewed through the hologram during the real time interferometric analysis. Assuming that the gross deformation because of bowing is uniform a vertically oriented fringe pattern 46 will be seen on the image 30''. The pattern 46 will have a density which is a function of the slope of the specimen with respect to its rest position. This slope will be minimum at the center and at the restrained edges, but will attain high levels between the two creating high frequency fringe patterns. This makes it extremely difficult to detect an anamolie in the deformation pattern which occurs in a high density fringe area.

In order to analyze the test section 30 for deformation anamolies in one of the areas having a high spacial frequency of fringes because of the bowing the mirror 20 is rotated through a small angle so as to shift the angle of the real time wave-front relative to the reconstructed wave-front. The angle through which it is shifted is dependent upon the angle of bowing and the section which it is desired to observe. FIG. 5 illustrates the image 30''' of the object as it is seen through the hologram after the mirror 20 has been rotated through a sufficient angle to thin the dense cluster of fringes which appear to the left of the image in FIG. 4. The resulting fringe pattern 48 is seen to have a relatively low density in the left area where a high density previously existed. This rotation increases the fringe density which occurred on the right of the image. It is seen that an anomaly 50 in the fringe pattern exists in the left section. This anomaly is of the type that evidences a failure of bond between the skin and the core and is not visible in the image of FIG. 4 because of the high fringe density in the section of the anomaly.

In order to examine a section of the test specimen visible on the right side of the image the mirror 20 is rotated back to its original position and then in the opposite direction through an arc similar to that used to obtain the image of FIG. 4. This lowers the fringe density on the right side of the image 30'''' and accordingly increases it on the left side. As shown in FIG. 6, no anamolies in the resulting fringes 50 are visible on the right side indicating a satisfactory bond in that area.

By similar modifications of the illumination beam successive areas on a workpiece may be normalized for gross deformation so that they may be studied for deformation anamolies.

As an alternative to the method of rotating the illumination beam it would be possible, although usually very impractical, to rotate the test specimen itself to correct for the gross deformation.

A correction of lesser magnitude in interference fringes resulting from gross deformation may be made by changing the apparent source of the illumination beam as by translating the spatial filter 18 along the path of the beam between the mirrors 16 and 20. This will correct for deformations which are normal to the holograph. For example, the fringes appearing in the center of the image 30'' in FIG. 4 could be eliminated by a translation of the spatial filter 18 through the same distance as the center of the panel 30 moved as a result of bowing.

We claim:

1. In the method of detecting structural anomalies in an object by holographic interferometry including the recordation of the wave-fronts reflected from the object while it is illuminated with coherent light at a first time on a hologram and the coherent interferometric comparison of such first wave-fronts as reconstructed from such hologram with second wave-fronts reflected from the object at a second time, after deformation of the object, while it is illuminated by light coherent with that used to reconstruct the first wave-fronts from said hologram, the improvement comprising the step of altering the position of the source of light illuminating the object at said second time relative to the position of the coherent source with respect to the object at said first time so as to modify the interference of said first and second wave-fronts to alter the spacial frequency of interferometric fringes visible on the images produced by the first and second wave-fronts at localized areas on such image, as a result of deformation of the object to allow inspection for deformation anomalies in such area.

2. The method of claim 1 wherein the interference fringes occurring on the image produced by said first and second wave-fronts includes first components which are a function of the overall deformation of the section of the object as a result of loading between the first and second times and second components which are a function of deformation caused between said first and second times because of localized structural anomalies in the object.

3. The method of claim 1 wherein the source of light for illuminating the object is said coherent source and includes a mirror which directs light to the object and the position of the said light relative to the object is altered by modifying the position of the mirror from the position which it assumed during the formation of the hologram.

4. The method of claim 1 wherein the light for illuminating the object is said coherent source and includes a pinhole and a lens and the position of the coherent source illuminating the object is altered relative to its position at the first time by moving the pinhole and the lens.

5. The method of real time holographic interferometric analysis of the deformation of an object between two times which includes: positioning the object relative to a coherent illumination source at a first time and forming a record of the light wave-fronts reflected from the object on a hologram by recording on a photographic plate the interference pattern between said light wave-fronts and a reference beam of light from said coherent source; developing and fixing said photographic plate to produce a hologram in the identical position previously occupied by the photographic plate relative to the illumination source, at a second time, after said deformation; viewing the image formed by the wave-front reconstructed from said hologram and the wave-front reflected from said object as it is illuminated by light coherent with said source; and varying the position of the object with respect to said light coherent with said source without varying the relative position of the illuminating source and the hologram in order to modify the spacial frequency of the interference fringes occurring on the object in localized sections thereof.

6. The method of claim 5 wherein the coherent source includes a laser and a lens upon which the beam of the laser is incident and which acts to diverge the beam, and the relative position of the object with respect to the illuminating light wave-fronts is varied by moving the lens relative to the object so as to change the radius of curvature of the light wave-fronts at their incidence with the object.

7. The method of claim 5 wherein said light coherent with said source is derived from apparatus including a mirror and the relative position of the object with respect to said light is varied by moving the mirror so as to change the angle of incidence of the illuminating wavefronts on the object.

* * * * *